(12) United States Patent
Laselva et al.

(10) Patent No.: US 10,840,967 B2
(45) Date of Patent: Nov. 17, 2020

(54) REDUCTION OF IN-DEVICE COEXISTENCE INTERFERENCE

(71) Applicant: NOKIA SOLUTIONS AND NETWORKS OY, Espoo (FI)

(72) Inventors: Daniela Laselva, Klarup (DK); Jussi-Pekka Koskinen, Oulu (FI); Tero Henttonen, Espoo (FI); Istvan Zsolt Kovacs, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/759,479

(22) PCT Filed: Sep. 25, 2015

(86) PCT No.: PCT/EP2015/072157
§ 371 (c)(1),
(2) Date: Mar. 12, 2018

(87) PCT Pub. No.: WO2017/050395
PCT Pub. Date: Mar. 30, 2017

(65) Prior Publication Data
US 2018/0262233 A1   Sep. 13, 2018

(51) Int. Cl.
*H04B 1/525* (2015.01)
*H04B 1/00* (2006.01)
(Continued)

(52) U.S. Cl.
CPC ............ *H04B 1/525* (2013.01); *H04B 1/005* (2013.01); *H04B 1/0475* (2013.01); *H04B 1/406* (2013.01);
(Continued)

(58) Field of Classification Search
CPC ........ H04B 1/005; H04B 1/406; H04B 1/525; H04B 1/0475; H04B 15/00; H04L 5/0062; H04W 88/06; H04W 24/10
See application file for complete search history.

(56) References Cited

U.S. PATENT DOCUMENTS

2012/0207040 A1* 8/2012 Comsa .............. H04W 72/1215
370/252
2013/0303214 A1* 11/2013 Ahmadi ............ H04W 72/1215
455/501
(Continued)

FOREIGN PATENT DOCUMENTS

WO   2014067131 A1   5/2014

OTHER PUBLICATIONS

International Search Report and Written Opinion for International Application No. PCT/EP2015/072157, dated Jul. 4, 2016 (9 pages).

*Primary Examiner* — Syed Haider
(74) *Attorney, Agent, or Firm* — Brake Hughes Bellermann LLP

(57) ABSTRACT

There are provided measures for reduction of in-device co-existence interference. Such measures exemplarily comprise (in a mobile network scenario allowing co-operation of a first radio access technology with a second radio access technology) detecting a need to avoid an in-device co-existence interference in relation to said co-operation, and performing at least one action for avoiding the in-device co-existence interference.

16 Claims, 15 Drawing Sheets

(51) Int. Cl.
    *H04L 5/00*          (2006.01)
    *H04B 1/403*        (2015.01)
    *H04B 1/04*          (2006.01)
    *H04W 24/10*       (2009.01)
    *H04W 88/06*       (2009.01)
    *H04B 15/00*        (2006.01)

(52) U.S. Cl.
    CPC ........... *H04L 5/0062* (2013.01); *H04W 24/10* (2013.01); *H04W 88/06* (2013.01); *H04B 15/00* (2013.01)

(56) References Cited

U.S. PATENT DOCUMENTS

| | | | | |
|---|---|---|---|---|
| 2014/0036745 A1* | 2/2014 | Koo | ................. | H04W 16/14 370/311 |
| 2014/0247759 A1* | 9/2014 | Zhang | .............. | H04W 52/0251 370/281 |
| 2015/0296526 A1* | 10/2015 | Behravan | ............ | H04W 24/02 370/329 |
| 2016/0380779 A1* | 12/2016 | Sharma | ............ | H04W 72/1215 370/312 |

* cited by examiner

REDUCTION OF IN-DEVICE COEXISTENCE INTERFERENCE

CROSS-REFERENCE TO RELATED APPLICATIONS

This application is a national stage entry of PCT Application No. PCT/EP2015/072157 filed Sep. 25, 2015, entitled "REDUCTION OF IN-DEVICE COEXISTENCE INTERFERENCE" which is hereby incorporated by reference in its entirety.

FIELD

The present invention relates to reduction of in-device coexistence interference. More specifically, the present invention exemplarily relates to measures (including methods, apparatuses and computer program products) for realizing reduction of in-device coexistence interference.

BACKGROUND

The present specification generally relates to In-Device Coexistence (IDC) interference which is an issue for user equipments (UE) transmitting and/or receiving radio frequency (RF) signals simultaneously to/from more than one wireless technologies, e.g. $3^{rd}$ Generation Partnership Project (3GPP) Long Term Evolution (LTE) and/or wireless local area network (WLAN) and/or Bluetooth® technologies, and the mitigation/prevention thereof.

Namely, because of the extreme proximity of multiple radio transceivers within such UE operating on adjacent/sub-harmonic frequencies, the interference generated from a transmitter of the collocated radio may be (much) higher than the actual received power level of the desired signal for a receiver, resulting in IDC interference. As is illustrated on FIG. 12, the IDC interference situation can be divided into three phases.

In particular, in a phase 1, the UE detects start of IDC interference but does not initiate a transmission of an IDC indication to an evolved NodeB (eNodeB, eNB) yet. Further, in a phase 2, the UE has initiated the transmission of the IDC indication to the eNB and no solution is yet configured by the eNB to solve the IDC issue. Furthermore, in a phase 3, the eNB has provided a solution that solved the IDC interference to the UE.

In the different phases, there are different UE behaviors related to radio resource management (RRM), radio link monitoring (RLM), and channel state information (CSI) measurements.

The present specification further relates to LTE-WLAN radio level integration and interworking. With respect to radio level integration LTE dual connectivity (DC) bearer split functionality is known, according to which LTE acts as a master node and a WLAN access point (AP) acts as a slave node, which is also known as LTE-WLAN aggregation (LWA). Furthermore, the present specification further relates to a bearer switch functionality as well as network-controlled LTE-WLAN interworking (LWI) by means of dedicated traffic steering command to e.g. offload traffic to WLAN.

If e.g. LTE and e.g. Wi-Fi (i.e. WLAN) as most prominent examples for an IDC situation transmit and/or receive in adjacent bands, adjacent channel interference between the radios can occur due to spurious emissions and imperfect filtering.

The problem arises that although some issues regarding IDC interferences are known, no solutions in particular in relation to the context of LWA and LWI are proposed. In particular, the problem arises that in such context IDC interferences and the results/effects thereof on communication quality/reliability/throughput/speed are to be prevented but at least mitigated. Hence, the problem arises as to how to increase communication quality/reliability/throughput/speed in IDC scenarios.

Hence, there is a need to provide for reduction of in-device coexistence interference.

SUMMARY

Various exemplary embodiments of the present invention aim at addressing at least part of the above issues and/or problems and drawbacks.

Various aspects of exemplary embodiments of the present invention are set out in the appended claims.

In particular, the above mentioned objects are achieved by what is defined in the appended independent claims. Advantageous modifications thereof are set forth in the appended dependent claims.

Any one of the above aspects enables an efficient reduction of interference in IDC scenarios to thereby solve at least part of the problems and drawbacks identified in relation to the prior art.

By way of exemplary embodiments of the present invention, there is provided reduction of in-device coexistence interference. More specifically, by way of exemplary embodiments of the present invention, there are provided measures and mechanisms for realizing reduction of in-device coexistence interference in connection of co-operation of at least two radio access technologies.

Thus, improvement is achieved by methods, apparatuses and computer program products enabling/realizing reduction of in-device coexistence interference.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
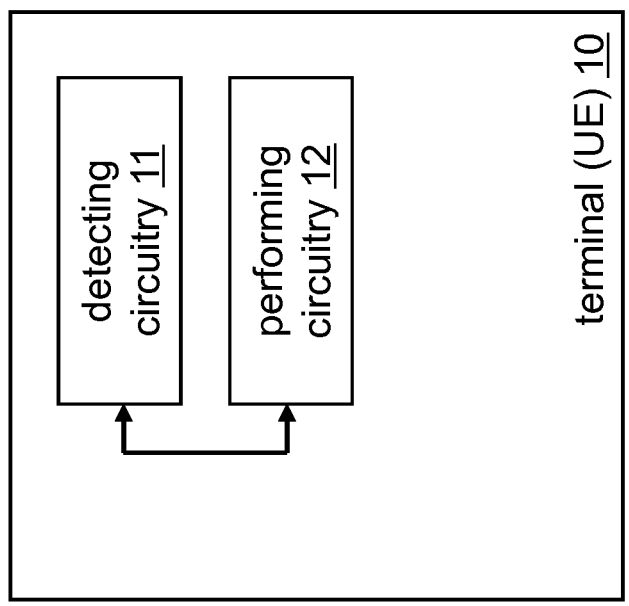
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, IDC scenarios and in particular LWA and LWI scenarios are used as non-limiting examples for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives). That is, exemplary additional operations or details of operations given according to variations of procedures shown in the appended Figures are inherently independent from each other as such.

According to exemplary embodiments of the present invention, in general terms, there are provided measures and mechanisms for (enabling/realizing) reduction of in-device coexistence interference.

In general, as basis for the present invention, it has been found a new criterion for IDC triggering is beneficial in order to indicate that the interference issue is caused by the LWA mode. Furthermore, in the context of LWA, measures such as Wi-Fi channel reconfiguration and deactivation of LWA are found as appropriate for overcoming IDC interference related issues.

Furthermore, for the case that legacy WLAN operations will be supported by a UE at the same time as LWA operations simultaneously, it is found useful if the IDC indication provides information on whether interference of adjacent bands between legacy WLAN and the aggregated WLAN link occurs.

In addition, it is found useful if a UE IDC report would contain WLAN frequency channels related to the interference.

For the sake of completeness, the present invention is made under the assumptions that solutions for LWA should not prevent discovery and use of other WLAN networks based on user preferences, and that the UE always accepts the LWA configuration but may then drop the configuration after sending a LWA failure indication. However, the present invention is not limited to those assumptions but is also applicable without these assumptions.

According to exemplary embodiments of the present invention, measures to mitigate IDC occurrence, once detected by the UE are disclosed. According to further exemplary embodiments of the present invention, measures for the eNB to prevent IDC interference for UEs using LWA/LWI in the first place are disclosed.

Figure 8:
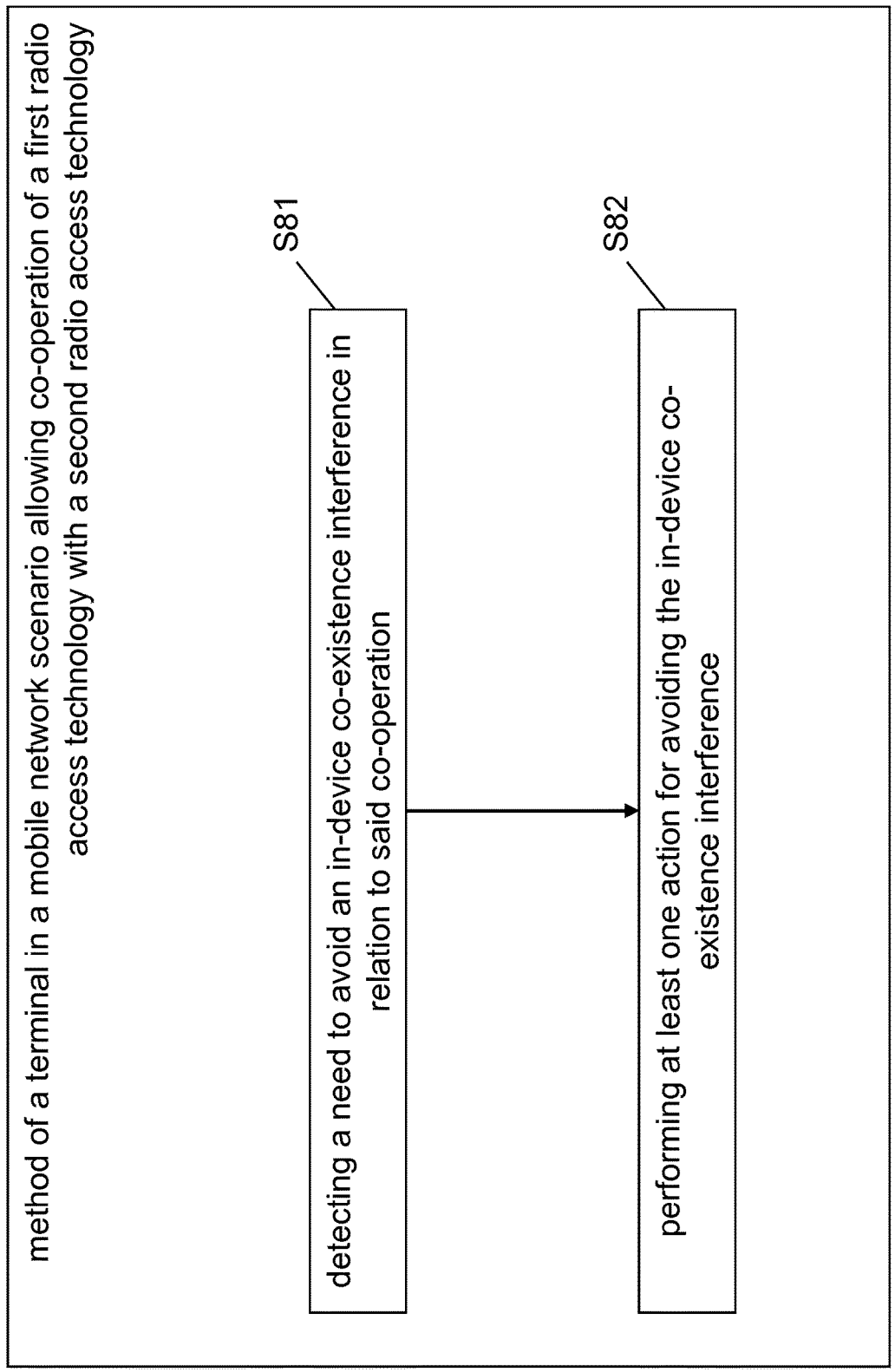
FIG. 8 is a schematic diagram of a procedure according to exemplary embodiments of the present invention.

FIG. 1 is a block diagram illustrating an apparatus according to exemplary embodiments of the present invention. The apparatus may be or be comprised in a terminal 10 (in a mobile network scenario allowing co-operation of a first radio access technology with a second radio access technology) such as a UE comprising a detecting circuitry 11 and a performing circuitry 12. The detecting circuitry 11 detects a need to avoid an in-device co-existence interference in relation to said co-operation. The performing circuitry 12 performs at least one action for avoiding the in-device co-existence interference. FIG. 8 is a schematic diagram of a procedure according to exemplary embodiments of the present invention. The apparatus according to FIG. 1 may perform the method of FIG. 8 but is not limited to this method. The method of FIG. 8 may be performed by the apparatus of FIG. 1 but is not limited to being performed by this apparatus.

In an embodiment, the co-operation as used throughput the description may comprise LWA. In another embodiment, the co-operation as used throughput the description may comprise LWI.

As shown in FIG. 8, a procedure (of a terminal in a mobile network scenario allowing co-operation of a first radio access technology with a second radio access technology) according to exemplary embodiments of the present invention comprises an operation of detecting (S81) a need to avoid an in-device co-existence interference in relation to said co-operation, and an operation of performing (S82) at least one action for avoiding the in-device co-existence interference.

Figure 2:
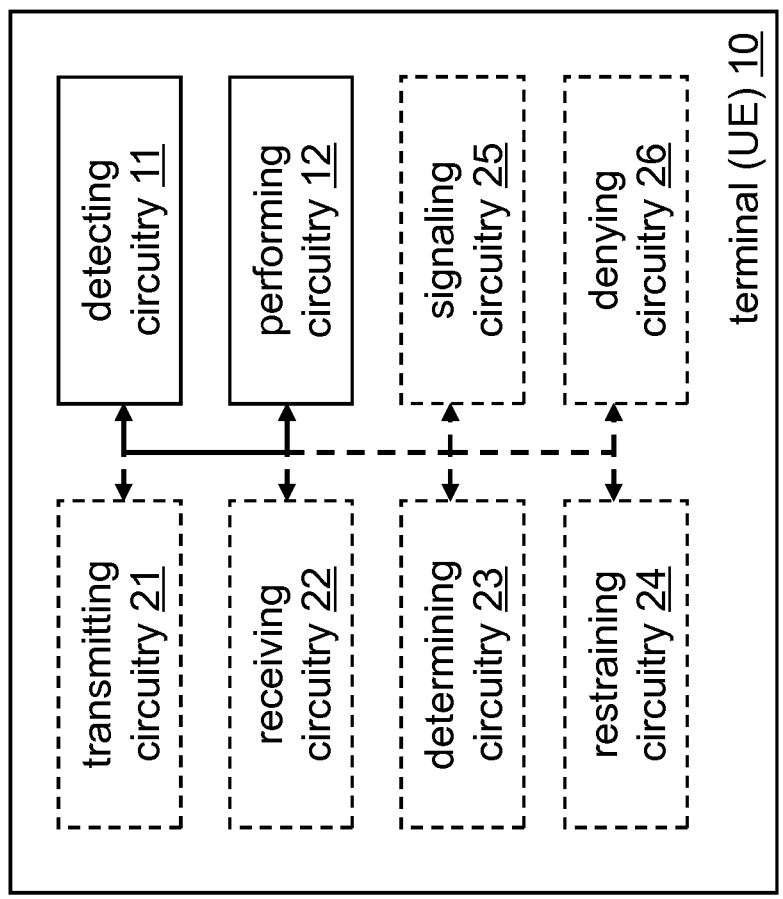
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise a transmitting circuitry 21, a receiving circuitry 22, a determining circuitry 23, a restraining circuitry 24, a signaling circuitry 25, and/or a denying circuitry 26.

Preferably, the apparatus according to FIG. 1 or 2 may perform the method of FIG. 8 and the below discussed modifications of the method of FIG. 8.

In an embodiment at least some of the functionalities of the apparatus shown in FIG. 1 or 2 may be shared between two physically separate devices forming one operational entity. Therefore, the apparatus may be seen to depict the operational entity comprising one or more physically separate devices for executing at least some of the described processes.

According to a variation of the method shown in FIG. 8, according to exemplary embodiments of the present invention, the at least one action comprises transmitting information indicative of said need to avoid said in-device coexistence interference, wherein said information comprises an indication of a channel of said first radio access technology and/or a channel of said second radio access technology which is causing in-device coexistence interference or is expected to cause in-device coexistence interference.

Here, it is noted that said in-device coexistence interference may occur in several ways. Namely, as a terminal could operate simultaneously in principle with any combination among
legacy LTE operation only
aggregation between LTE and WLAN only, and
legacy WLAN operation only,
the transmitted information may indicate which of the WLAN links are interfering with which of the LTE links (or vice-versa).

According to a further variation of the method shown in FIG. 8, according to exemplary embodiments of the present invention, said information comprises at least one of a request to deconfigure said co-operation of said first radio access technology with said second radio access technology, a request to deactivate said co-operation of said first radio access technology with said second radio access technology, and a request to suspend said co-operation of said first radio access technology with said second radio access technology.

According to a still further variation of the method shown in FIG. 8, according to exemplary embodiments of the present invention, said request is transmitted in a measurement report regarding said second radio access technology, or said request is represented by a predetermined flag in a transmitted message comprising at least said predetermined flag.

According to a still further variation of the method shown in FIG. 8, according to exemplary embodiments of the present invention, said information comprises an indication of at least one access entity of the second radio access technology that is causing or is expected to cause in-device coexistence interference during said co-operation.

According to a variation of the procedure shown in FIG. 8, exemplary additional operations are given. According to such variation, an exemplary method according to exemplary embodiments of the present invention may comprise an operation of receiving a message indicative of a configuration of said co-operation of said first radio access technology with said second radio access technology, and an operation of determining that said configuration of said co-operation would cause in-device coexistence interference. The at least one action may (further) comprise restraining from applying the received configuration for the co-operation.

According to a variation of the procedure shown in FIG. 8, exemplary additional operations are given. According to such variation, an exemplary method according to exemplary embodiments of the present invention may comprise an operation of signaling a message indicative of a non-acknowledgement of said configuration of said co-operation.

According to a variation of the procedure shown in FIG. 8, exemplary additional operations are given. According to such variation, an exemplary method according to exemplary embodiments of the present invention may comprise an operation of signaling a message indicative of an expected in-device coexistence interference if the received configuration is applied for said co-operation.

According to a variation of the procedure shown in FIG. 8, exemplary additional operations are given. According to such variation, an exemplary method according to exemplary embodiments of the present invention may comprise an operation of receiving a message including a list of at least one access entity to said second radio access technology considered for said co-operation of said first radio access technology with said second radio access technology and an operation of detecting expectation of said in-device coexistence interference with respect to at least one access entity of said list. The at least one action may (further) comprise denying co-operation of said first radio access technology with said second radio access technology with respect to said at least one access entity.

According to a variation of the procedure shown in FIG. 8, exemplary additional operations are given. According to such variation, an exemplary method according to exemplary embodiments of the present invention may comprise an operation of receiving a message including a list of at least one access entity to said second radio access technology considered for a measurement report, and an operation of detecting expectation of said in-device coexistence interference with respect to at least one access entity of said list. The least one action may (further) comprise restraining from including, to the measurement report, said at least one access entity expected to cause in-device coexistence interference.

According to exemplary embodiments of the present invention, the first radio access technology is at least one of LTE, LTE-A, and 5G, and/or the second radio access technology is at least one of WLAN, Wi-Fi, Bluetooth®, and small cell technology, and/or said co-operation is either aggregation operation of said first radio access technology with said second radio access technology or interworking operation of said first radio access technology with said second radio access technology, and/or said need to avoid said in-device coexistence interference includes a need to avoid present in-device coexistence interference and a need to avoid expected in-device coexistence interference.

Figure 3:
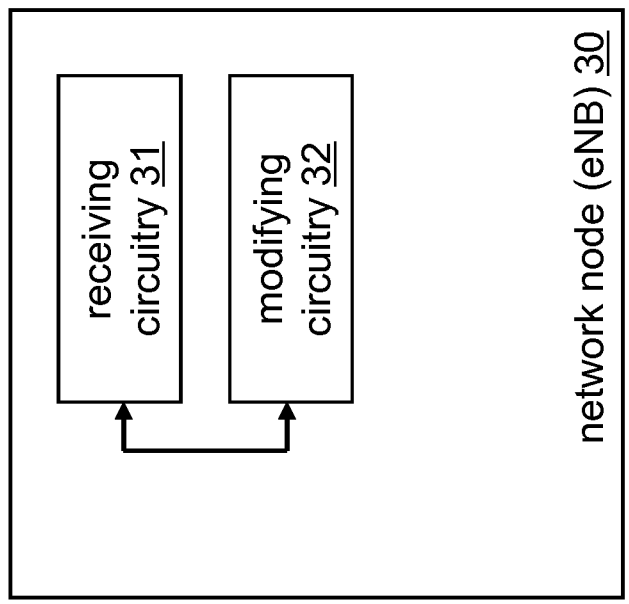
FIG. 3 is a block diagram illustrating an apparatus according to exemplary embodiments of the present invention.
Figure 9:
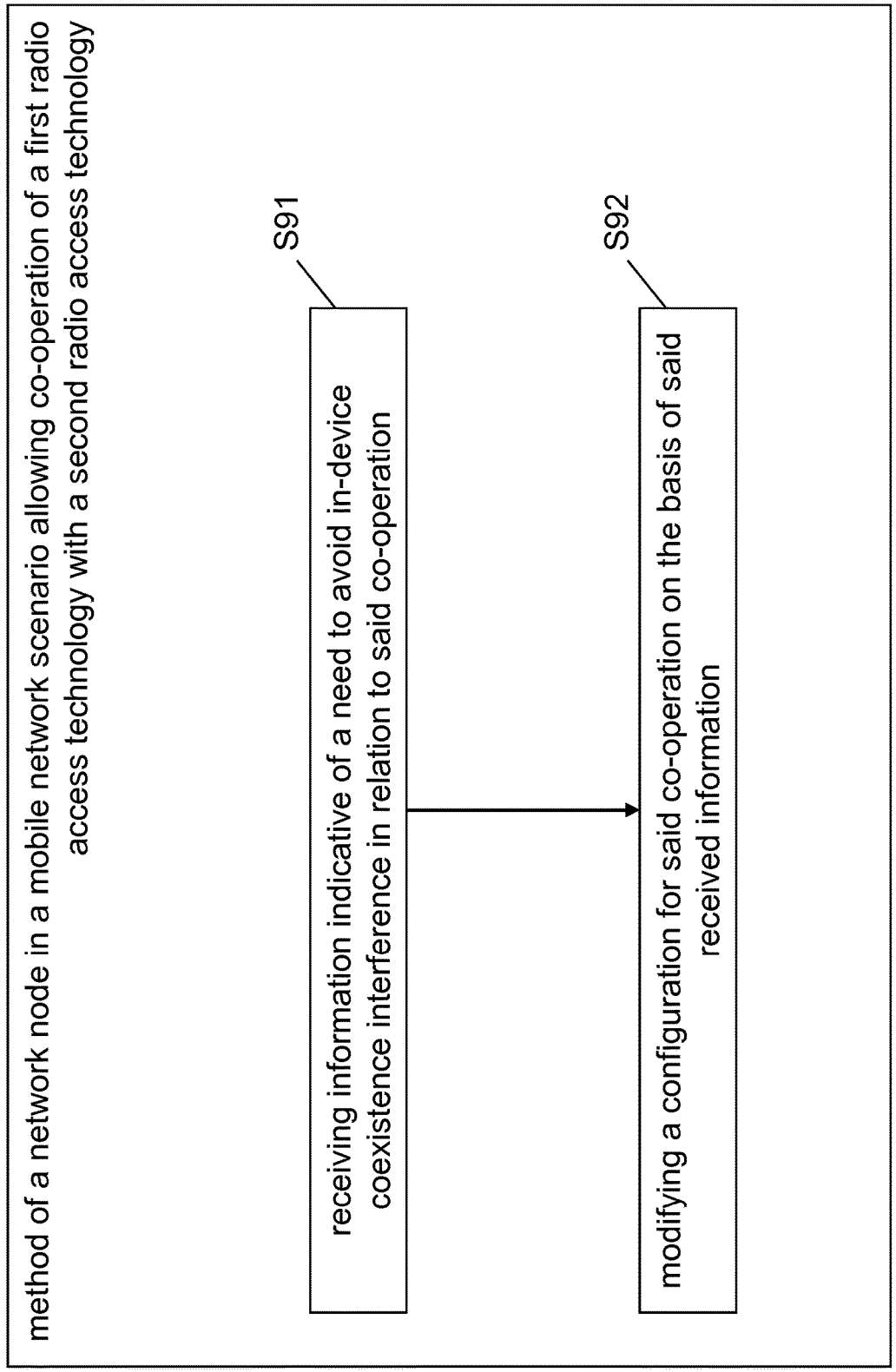
FIG. 9 is a schematic diagram of a procedure according to exemplary embodiments of the present invention.

FIG. 3 is a block diagram illustrating an apparatus according to exemplary embodiments of the present invention. The apparatus may be or be comprised in a network node 30 (in a mobile network scenario allowing co-operation of a first radio access technology with a second radio access technology) such as an eNB comprising a receiving circuitry 31 and a modifying circuitry 32. The receiving circuitry 31 receives information indicative of a need to avoid in-device coexistence interference in relation to said co-operation. The modifying circuitry 32 modifies a configuration for said co-operation on the basis of said received information. FIG. 9 is a schematic diagram of a procedure according to exemplary embodiments of the present invention. The apparatus according to FIG. 3 may perform the method of FIG. 9 but is not limited to this method. The method of FIG. 9 may be performed by the apparatus of FIG. 3 but is not limited to being performed by this apparatus.

As shown in FIG. 9, a procedure (of a network node in a mobile network scenario allowing co-operation of a first radio access technology with a second radio access technology) according to exemplary embodiments of the present invention comprises an operation of receiving (S91) information indicative of a need to avoid in-device coexistence interference in relation to said co-operation, and an operation of modifying (S92) modifying a configuration for said co-operation on the basis of said received information.

Figure 4:
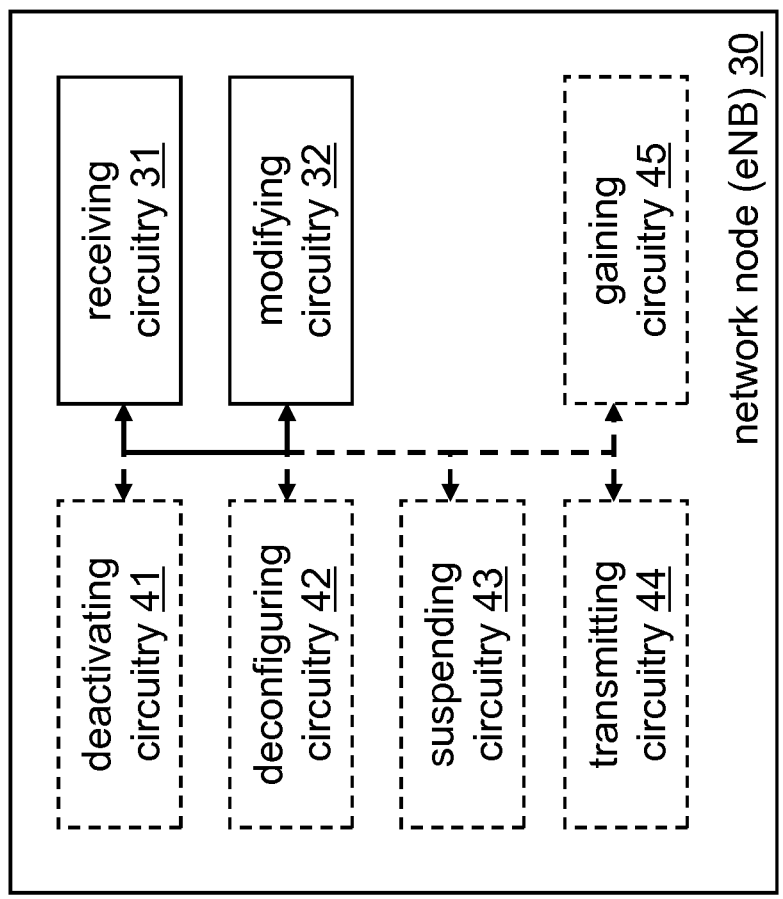
FIG. 4 is a block diagram illustrating an apparatus according to exemplary embodiments of the present invention.

FIG. 4 is a block diagram illustrating an apparatus according to exemplary embodiments of the present invention. In particular, FIG. 4 illustrates a variation of the apparatus shown in FIG. 3. The apparatus according to FIG. 4 may thus further comprise a deactivating circuitry 41, a deconfiguring circuitry 42, a suspending circuitry 43, a transmitting circuitry 44, and/or a gaining circuitry 45.

Preferably, the apparatus according to FIG. 3 or 4 may perform the method of FIG. 9 and the below discussed modifications of the method of FIG. 9.

In an embodiment at least some of the functionalities of the apparatus shown in FIG. 3 or 4 may be shared between two physically separate devices forming one operational entity. Therefore, the apparatus may be seen to depict the operational entity comprising one or more physically separate devices for executing at least some of the described processes.

According to a variation of the method shown in FIG. 9, according to exemplary embodiments of the present invention, said information comprises an indication of a channel of said first radio access technology and/or a channel of said second radio access technology which is causing in-device coexistence interference or is expected to cause in-device coexistence interference.

According to a variation of the procedure shown in FIG. 9, exemplary details of the modifying operation (S92) are given. Such exemplary modifying operation (S92) according to exemplary embodiments of the present invention may comprise an operation of deactivating said co-operation with respect to said channel of said first radio access technology and/or said channel of said second radio access technology causing in-device coexistence interference or expected to cause in-device coexistence interference.

According to a further variation of the procedure shown in FIG. 9, exemplary details of the modifying operation (S92) are given. Such exemplary modifying operation (S92) according to exemplary embodiments of the present invention may comprise an operation of deconfiguring said co-operation, if said information comprises a request to deconfigure said co-operation, an operation of deactivating said co-operation, if said information comprises a request to deactivate said co-operation, and an operation of suspending said co-operation, if said information comprises a request to suspend said co-operation.

According to a variation of the method shown in FIG. 9, according to exemplary embodiments of the present invention, said request is received in a measurement report regarding said second radio access technology, or said request is represented by a predetermined flag in a received message comprising at least said predetermined flag.

According to a variation of the method shown in FIG. 9, according to exemplary embodiments of the present invention, said information comprises an indication of at least one access entity of the second radio access technology that is causing or is expected to cause in-device coexistence interference during said co-operation.

According to a variation of the procedure shown in FIG. 9, exemplary additional operations and exemplary details of the receiving operation (S91) are given. According to such variation, an exemplary method according to exemplary embodiments of the present invention may comprise an operation of transmitting a message indicative of a configuration of said co-operation of said first radio access technology with said second radio access technology.

Further, such exemplary receiving operation (S91) according to exemplary embodiments of the present invention may comprise an operation of gaining a message indicative of a non-acknowledgement of said configuration of said co-operation, or an operation of gaining a message indicative of an expected in-device coexistence interference.

According to a further variation of the procedure shown in FIG. 9, exemplary additional operations are given.

According to such variation, an exemplary method according to exemplary embodiments of the present invention may comprise an operation of transmitting a message including a list of at least one access entity to said second radio access technology considered for said co-operation of said first radio access technology with said second radio access technology.

As mentioned above, the first radio access technology may be at least one of LTE, LTE-A, and 5G, and/or the second radio access technology may be at least one of WLAN, Wi-Fi, Bluetooth®, and small cell technology, and/or said co-operation may be either aggregation operation of said first radio access technology with said second radio access technology or interworking operation of said first radio access technology with said second radio access technology, and/or said need to avoid said in-device coexistence interference may include a need to avoid present in-device coexistence interference and a need to avoid expected in-device coexistence interference.

In other words, according to exemplary embodiments of the present invention, a terminal (i.e. UE) provides assistance to the eNB, and further have autonomous UE actions available for the case that IDC issues are detected or expected in connection with the usage of LTE-WLAN aggregation (LWA) or LTE-WLAN interworking (LWI), for the purpose of mitigating/avoiding IDC interference.

Corresponding measures according to exemplary embodiments of the present invention can be summarized as follows.

The UE may indicate problematic (subject to IDC interference) WLAN access points (AP) to the eNB. Problematic WLAN APs could be identified using a WLAN identifier (e.g. basic service set identifier (BSSID), service set identifier (SSID), homogenous extended service set identifier (HESSID)), a channel number, and/or a ISM band.

Further, the UE may not include problematic (subject to IDC interference) WLAN APs in the measurement report.

Still further, the UE may not trigger measurement reporting event towards the problematic (subject to IDC interference) WLAN APs, i.e., a measurement report is not sent.

Furthermore, the UE may not start using problematic (subject to IDC interference) WLAN APs for offloading regardless of the configured rules/thresholds, i.e., the UE may be allowed to ignore rules/thresholds in case of IDC.

Still further, when configured with IDC and WLAN measurement report, the UE may indicate in the WLAN measurement report whether the UE could be subject to IDC interference if the reported AP(s) were to be used.

Finally, when configured with IDC and LWA/LWI, the UE may be allowed to send an IDC indication to the eNB with cause value "LWA/LWI problem" or similar to indicate that there are IDC issues with LWA/LWI operation and the suggestion to the eNB to deconfigure/deactivate/suspend LWA.

Figure 13:
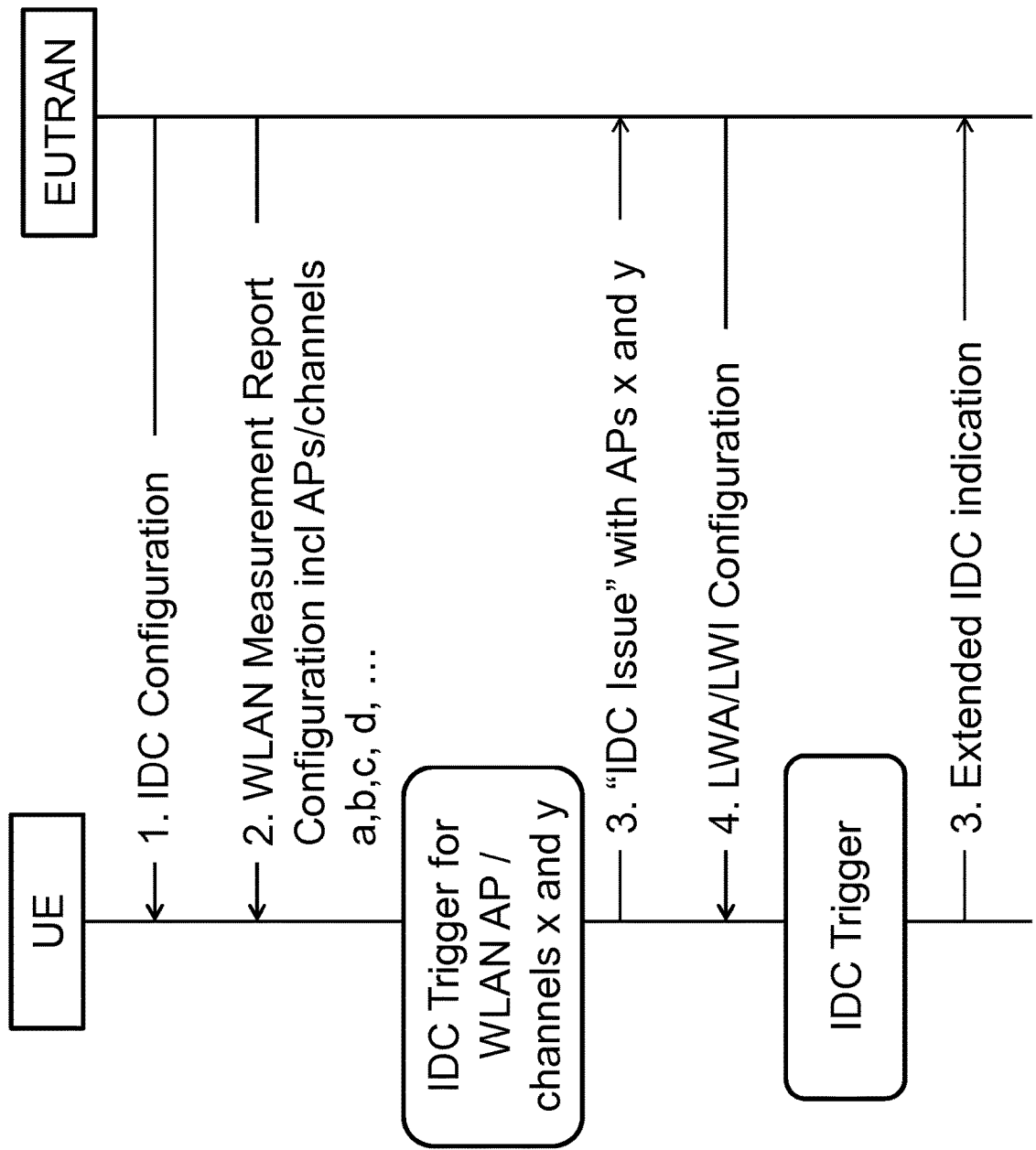
FIG. 13 shows a schematic diagram of signaling sequences according to exemplary embodiments of the present invention.

FIG. 13 shows a schematic diagram of signaling sequences according to exemplary embodiments of the present invention described in more specific terms below.

Namely, in more specific terms, according to exemplary embodiments of the present invention, an extended UE IDC indication may be provided to the eNB in the case that IDC is detected.

Namely, if the UE which is configured in LWA mode or which has received an LWI traffic steering command detects IDC issues, it reports an extended IDC indication and assistance information comprising resolution options for the eNB.

In particular, according to exemplary embodiments of the present invention it may be indicated (e.g. by the extended IDC indication) whether interference is caused by LWA/LWI operations, for instance with a flag to indicate whether e.g.

simultaneous LTE and the aggregated WLAN link operations are the reason for the LTE/WLAN channel(s) causing/suffering from IDC interference, simultaneous legacy WLAN and the aggregated WLAN link operations are the reason for the LTE/WLAN channel(s) causing/suffering from IDC interference, and simultaneous LTE and legacy WLAN link operations (after execution of an LWI traffic steering command) are the reason for the LTE/WLAN channel(s) causing/suffering from IDC interference.

According to exemplary embodiments of the present invention, the eNB interprets this report/indication e.g. as "can not use LWA", "cannot use LWA without IDC", "cannot use WLAN", "onload/offload back the UE's traffic", or similar.

Further, in the more specific terms, according to exemplary embodiments of the present invention, the UE may undertake actions/measures when experiencing IDC problems because of simultaneous LWA/LWI/WLAN operations.

Namely, the UE which is configured in LWA mode reports to the eNB a request to deconfigure/deactivate/suspend LWA in case the UE experiences/anticipates IDC issues.

According to exemplary embodiments of the present invention, such UE request may be included e.g. in a WLAN measurement report. Further, such request may be realized as a flag whose mapping to the "reason" is pre-known at the eNB.

Further, according to exemplary embodiments of the present invention, the UE for which LWA is not configured should not accept any LWA configuration from the eNB in case the LWA configuration would cause IDC interference. Namely, the UE may respond with a (an LWA) configuration rejection or may send an LWA failure to the eNB upon reception of LWA configuration.

Further, according to exemplary embodiments of the present invention, the UE which is configured to utilize IDC may also indicate whether it expects IDC problems to occur for a given WLAN AP which is included in a measuring set (for measurement report) and/or in a mobility set (for eNB-assisted mobility). The indication may be triggered when the UE is configured with WLAN measurement reports or is configured for LWA mode.

Exemplary embodiments of the present invention described above achieve at least the following advantages.

Namely, according to these embodiments, the UE is able help the eNB to prevent/solve IDC issues by either assisting the eNB with further relevant information helpful to solve the issues or by means of autonomous actions.

Accordingly, the behavior of such UEs experiencing IDC problems is predictable.

Figure 5:
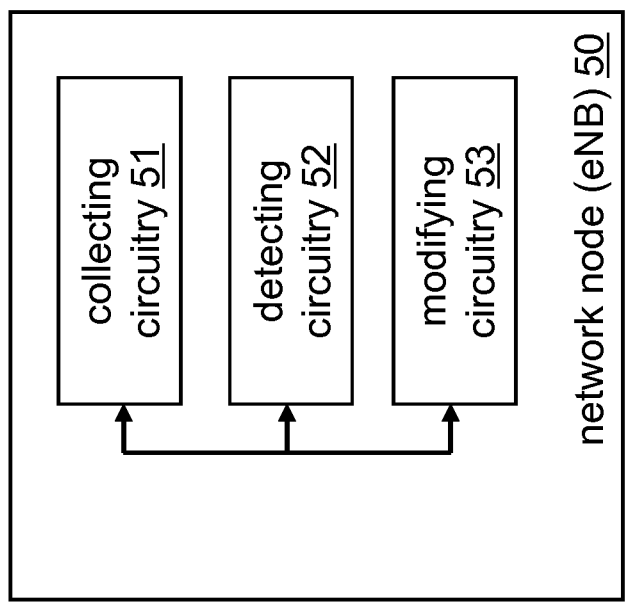
FIG. 5 is a block diagram illustrating an apparatus according to exemplary embodiments of the present invention.
Figure 10:
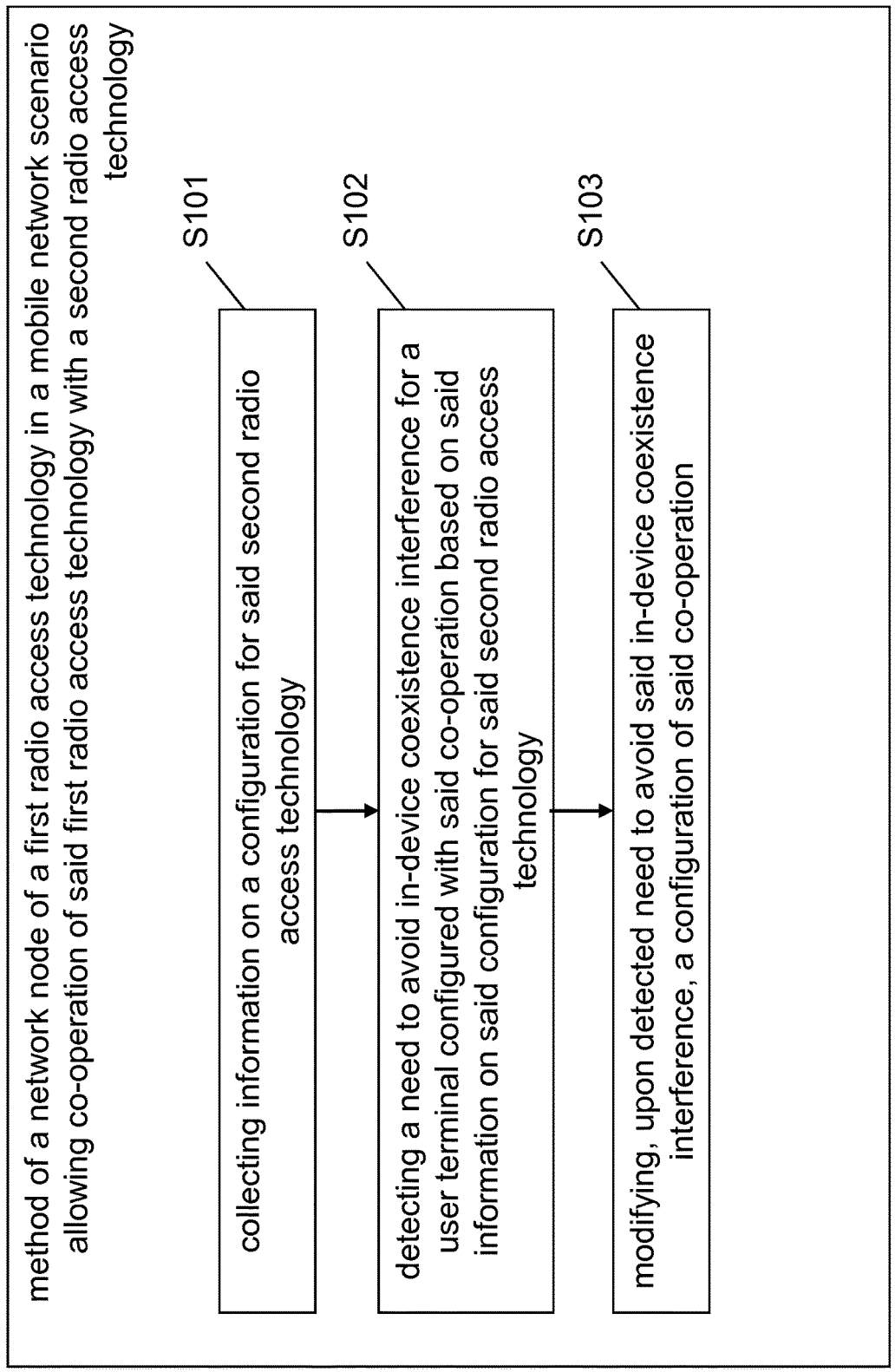
FIG. 10 is a schematic diagram of a procedure according to exemplary embodiments of the present invention.

FIG. 5 is a block diagram illustrating an apparatus according to exemplary embodiments of the present invention. The apparatus may be or be comprised in a network node 50 (of a first radio access technology in a mobile network scenario allowing co-operation of said first radio access technology with a second radio access technology) such as an eNB comprising a collecting circuitry 51, a detecting circuitry 52, and a modifying circuitry 53. The collecting circuitry 51 collects information on a configuration for said second radio access technology. The detecting circuitry 52 detects a need to avoid in-device coexistence interference for a user terminal configured with said co-operation based on said information on said configuration for said second radio access technology. Further, the modifying circuitry 53 modifies, upon detected need to avoid said in-device coexistence interference, a configuration of said co-operation. FIG. 10 is a schematic diagram of a procedure according to exemplary embodiments of the present invention. The apparatus according to FIG. 5 may perform the method of FIG. 10 but is not limited to this method. The method of FIG. 10 may be performed by the apparatus of FIG. 5 but is not limited to being performed by this apparatus.

In an embodiment, the configuration of said co-operation comprises configuration(s) of the first radio access technology (e.g. LTE-LTE-A or 5G) and/or configuration(s) of the second radio access technology (e.g. WLAN). In case there are more than two co-operating radio access technologies, then the co-operation configuration may comprise also the configuration(s) of the at least one third radio access technology.

As shown in FIG. 10, a procedure (of a network node of a first radio access technology in a mobile network scenario allowing co-operation of said first radio access technology with a second radio access technology) according to exemplary embodiments of the present invention comprises an operation of collecting (S101) information on a configuration for said second radio access technology, an operation of detecting (S102) a need to avoid in-device coexistence interference for a user terminal configured with said co-operation based on said information on said configuration for said second radio access technology, and an operation of modifying (S103), upon detected need to avoid said in-device coexistence interference, a configuration of said co-operation.

Figure 6:
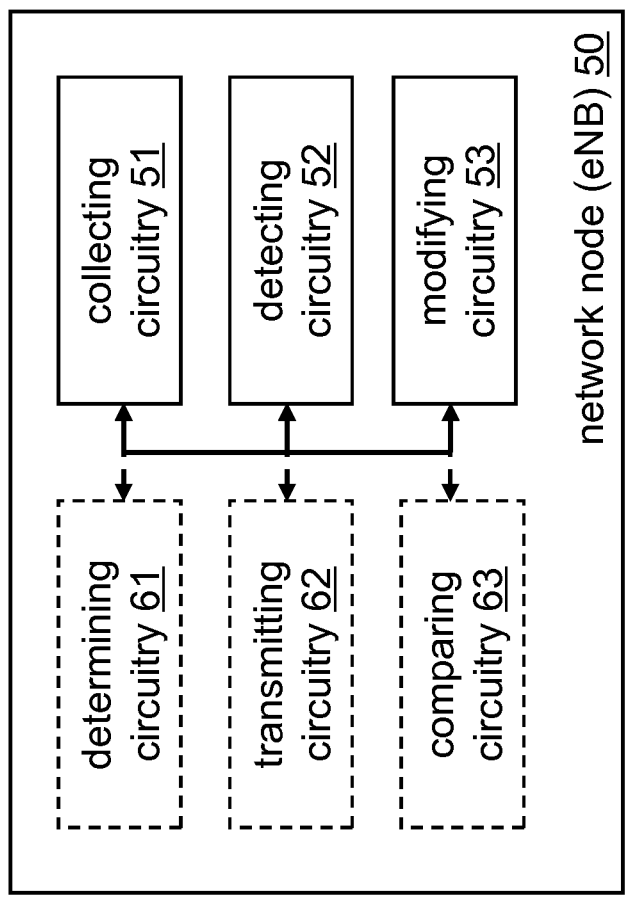
FIG. 6 is a block diagram illustrating an apparatus according to exemplary embodiments of the present invention.

FIG. 6 is a block diagram illustrating an apparatus according to exemplary embodiments of the present invention. In particular, FIG. 6 illustrates a variation of the apparatus shown in FIG. 5. The apparatus according to FIG. 6 may thus further comprise a determining circuitry 61, a transmitting circuitry 62, and/or a comparing circuitry 63.

Preferably, the apparatus according to FIG. 5 or 6 may perform the method of FIG. 10 and the below discussed modifications of the method of FIG. 10.

In an embodiment at least some of the functionalities of the apparatus shown in FIG. 5 or 6 may be shared between two physically separate devices forming one operational entity. Therefore, the apparatus may be seen to depict the operational entity comprising one or more physically separate devices for executing at least some of the described processes.

According to a variation of the procedure shown in FIG. 10, exemplary details of the collecting operation (S101) are given. Such exemplary collecting operation (S101) according to exemplary embodiments of the present invention may comprise an operation of collecting, from a management entity of said second radio access technology, information on which at least one access entity to said second radio access technology managed by said management entity uses a specific configuration for said second radio access technology.

Here, it is noted that the specific configuration may be e.g. a configuration selected out of a couple of configurations, or a predetermined configuration.

In one embodiment, the eNB (as an example of the network node of the first radio access technology) may first query which WLAN configurations are used in the WLAN (as an example of the second radio access technology). The query may be directed to a managing entity of the WLAN managing many access nodes/points (APs) of the WLAN. Then, after receiving a response from the WLAN, the eNB may continue querying from the WLAN which of the APs are using which of these reported configurations. The eNB may then select an AP for the co-operation on the basis of the used configurations so that IDC interference is avoided. E.g. the eNB may select an AP applying a channel which does not cause IDC interference to the UE communicating also with the LTE at a certain frequency.

In one embodiment of the present invention, the network node of the first radio access technology (e.g. an eNB) may ask the management entity of said second radio access technology (e.g. a WT) for configurations used by available access entities (e.g. WLAN APs) managed by the management entity. Once the management entity has delivered information on the configurations used by any of the managed access entities, the network node of the first radio access technology may select one specific configuration from the information on the used configurations, and may subsequently query for the access entity or access entities using that specific configuration.

In so doing, a configuration as the specific configuration may be selected from supplied configurations such that the co-operation of said first radio access technology with a second radio access technology (e.g. an LWA operation) can be started without incurring IDC interference.

According to a variation of the procedure shown in FIG. 10, exemplary details of the collecting operation (S101) are given. Such exemplary collecting operation (S101) according to exemplary embodiments of the present invention may comprise an operation of determining a configuration for said second radio access technology, and an operation of transmitting said determined configuration for said second radio access technology to be applied by the second radio access technology.

According to a variation of the procedure shown in FIG. 10, exemplary details of the detecting operation (S102) are given. Such exemplary detecting operation (S102) according to exemplary embodiments of the present invention may comprise an operation of comparing said configuration for said second radio access technology with a configuration for said first radio access technology, and an operation of detecting that a change of the configuration of the co-operation is needed to avoid said in-device coexistence interference.

According to a variation of the procedure shown in FIG. 10, exemplary details of the modifying operation (S103) are given. Such exemplary modifying operation (S103) according to exemplary embodiments of the present invention may comprise an operation of transmitting, to the second radio access technology, at least one of a message indicative of existence or expectation of said in-device coexistence interference, or a message indicative of that an interference avoidance measure regarding said in-device coexistence interference is to be utilized, and a message indicating a changed configuration for said second radio access technology, wherein the configuration is changed such that said in-device coexistence interference is avoided.

As mentioned above, the first radio access technology may be at least one of LTE, LTE-A, and 5G, and/or the second radio access technology may be at least one of WLAN, Wi-Fi, Bluetooth®, and small cell technology, and/or said co-operation may be either aggregation operation of said first radio access technology with said second radio access technology or interworking operation of said first radio access technology with said second radio access technology, and/or said need to avoid said in-device coexistence interference may include a need to avoid present in-device coexistence interference and a need to avoid expected in-device coexistence interference.

Figure 7:
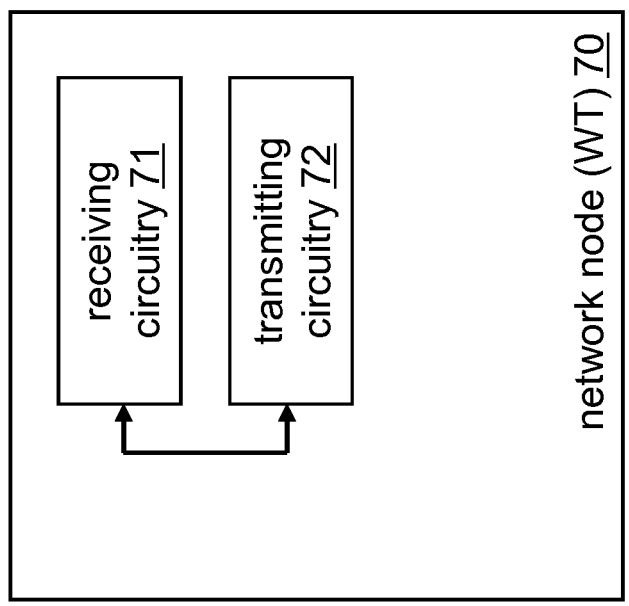
FIG. 7 is a block diagram illustrating an apparatus according to exemplary embodiments of the present invention.
Figure 11:
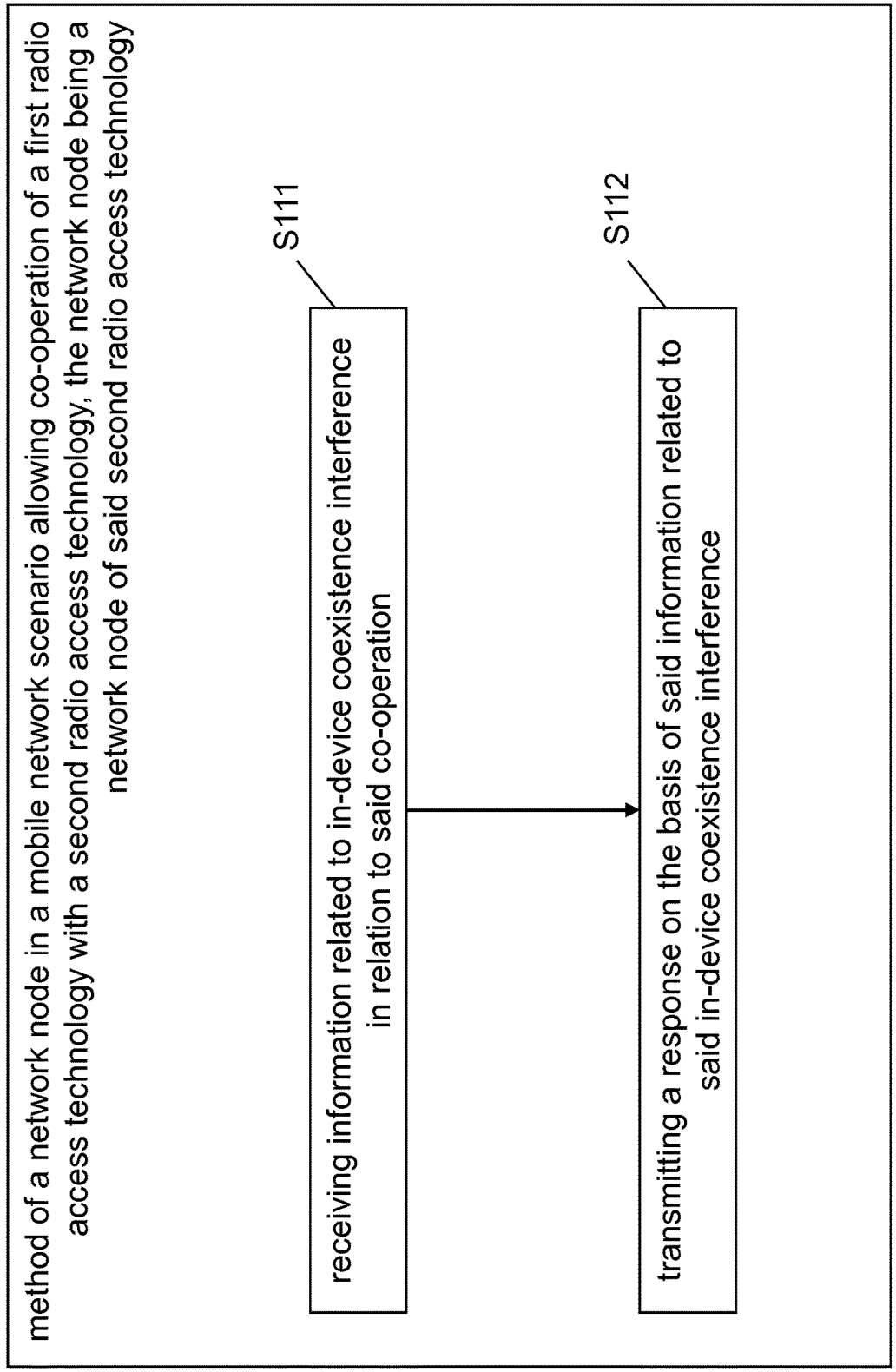
FIG. 11 is a schematic diagram of a procedure according to exemplary embodiments of the present invention.
Figure 12:
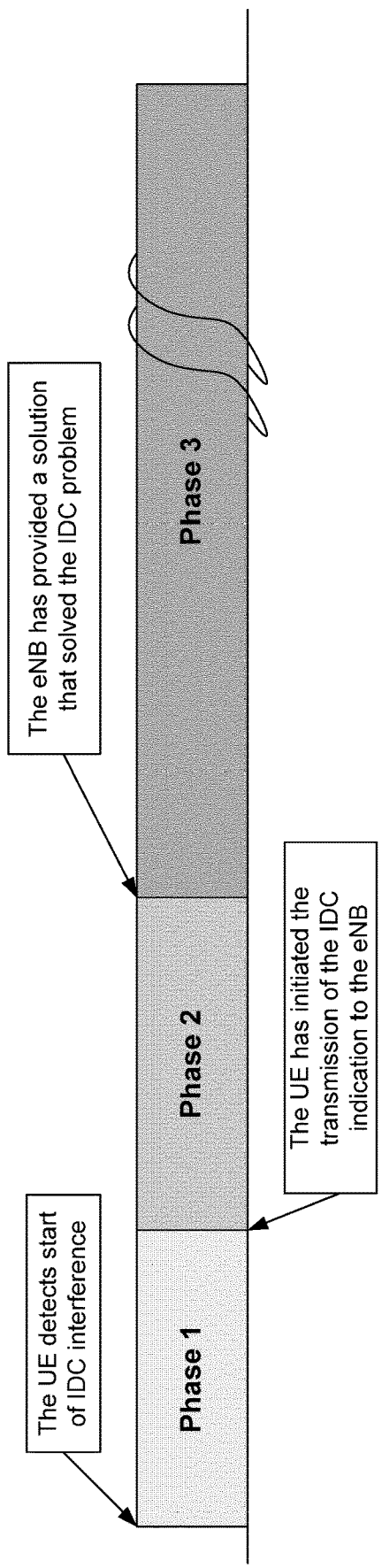
FIG. 12 is a schematic diagram illustrating different phases of IDC interference related operations by a terminal.

FIG. 7 is a block diagram illustrating an apparatus according to exemplary embodiments of the present invention. The apparatus may be or be comprised in a network node 70 (in a mobile network scenario allowing co-operation of a first radio access technology with a second radio access technology, the network node being a network node of said second radio access technology) such as a WT (i.e. a WLAN termination) or a WLAN AP comprising a receiving circuitry 71 and a transmitting circuitry 72. The receiving circuitry 71 receives information related to in-device coexistence interference in relation to said co-operation. Further, the transmitting circuitry 72 transmits a response on the basis of said information related to said in-device coexistence interference. FIG. 11 is a schematic diagram of a procedure according to exemplary embodiments of the present invention. The apparatus according to FIG. 7 may perform the method of FIG. 11 but is not limited to this method. The method of FIG. 11 may be performed by the apparatus of FIG. 7 but is not limited to being performed by this apparatus. Preferably, the apparatus according to FIG. 7 may perform the method of FIG. 11 and the below discussed modifications of the method of FIG. 11.

As shown in FIG. 11, a procedure (of a network node in a mobile network scenario allowing co-operation of a first radio access technology with a second radio access technology, the network node being a network node of said second radio access technology) according to exemplary embodiments of the present invention comprises an operation of receiving (S111) information related to in-device coexistence interference in relation to said co-operation, and an operation of transmitting (S112) a response on the basis of said information related to said in-device coexistence interference.

In an embodiment at least some of the functionalities of the apparatus shown in FIG. 7 may be shared between two physically separate devices forming one operational entity. Therefore, the apparatus may be seen to depict the operational entity comprising one or more physically separate devices for executing at least some of the described processes.

According to a variation of the method shown in FIG. 11, according to exemplary embodiments of the present invention, said information related to said in-device coexistence interference comprises a query for information on which at least one access entity to said second radio access technology managed by a management entity of said second radio access technology uses a specific configuration for said second radio access technology, and said response comprises a list of said at least one access entity to said second radio access technology using said specific configuration for said second radio access technology as information on said configuration for said second radio access technology.

According to a variation of the method shown in FIG. 11, according to exemplary embodiments of the present invention, said information related to said in-device coexistence interference comprises an indication of an existence or expectation of said in-device coexistence interference, or an indication of that an interference avoidance measure regarding said in-device coexistence interference is to be utilized.

According to a further variation of the method shown in FIG. 11, according to exemplary embodiments of the present invention, said response comprises a request to modify a configuration for said first radio access technology.

According to a still further variation of the method shown in FIG. 11, according to exemplary embodiments of the present invention, said information related to said in-device coexistence interference comprises a changed configuration for said second radio access technology changed such that said in-device coexistence interference is avoided. Further, said response comprises at least one of an indication of an acceptance of said changed configuration for said second radio access technology, and an indication of a rejection of said changed configuration for said second radio access technology.

As mentioned above, the first radio access technology may be at least one of LTE, LTE-A, and 5G, and/or the second radio access technology may be at least one of WLAN, Wi-Fi, Bluetooth®, and small cell technology, and/or said co-operation may be either aggregation operation of said first radio access technology with said second radio access technology or interworking operation of said first radio access technology with said second radio access technology, and/or said need to avoid said in-device coexistence interference may include a need to avoid present in-device coexistence interference and a need to avoid expected in-device coexistence interference.

In other words, according to exemplary embodiments of the present invention, a coordination between LTE radio and WLAN network via a network interface (Xw) for the purpose of avoiding IDC interference for selected UE(s) utilizing LTE-WLAN aggregation (LWA) or LTE-WLAN interworking (LWI) is provided.

Corresponding measures according to exemplary embodiments of the present invention include procedures and signaling to retrieve, negotiate, and request to comply with, WLAN radio configurations (e.g. the WLAN channel(s) used by a WLAN AP) over the interface (e.g. Xw) between the WLAN network (e.g. WLAN termination (WT)) and the LTE eNB. Based on the WLAN assistance and negotiation over Xw, the WLAN channels and LTE frequencies used for e.g. data transmissions to a UE, are selected (possibly re-assigned) so that there is no IDC problem for a given UE activated in LWA or LWI.

Figure 14:
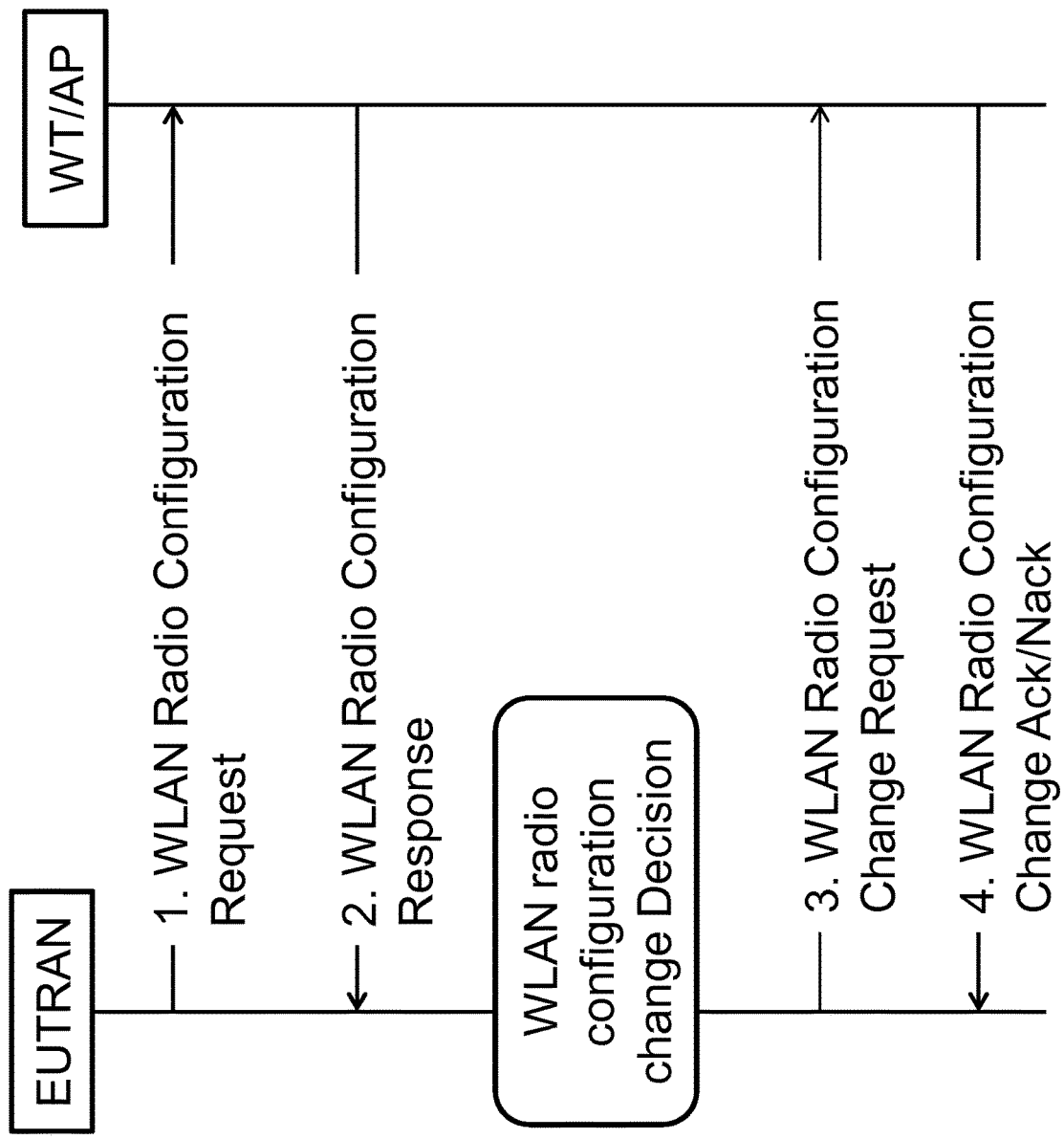
FIG. 14 shows a schematic diagram of signaling sequences according to exemplary embodiments of the present invention.

FIG. 14 shows a schematic diagram of signaling sequences according to exemplary embodiments of the present invention described in more specific terms below.

Namely, in more specific terms, according to exemplary embodiments of the present invention, a negotiation (over the LTE-WLAN interface, e.g., Xw) between the eNB and the WLAN AP (or WT) of a WLAN channel may be undertaken to prevent IDC.

In particular, the WLAN AP and/or WT may provide its used WLAN radio configuration(s) to the eNB. Such WLAN radio configuration refers e.g. to WLAN numerologies (e.g. 'country', 'operating class', and/or 'channel number', 'ISM band'). The exact details can vary, but may preferably determine the WLAN radio configuration (i.e. frequencies, channel, etc.) used at an AP.

Further, the eNB may query currently used WLAN radio configuration(s) from the WT or WLAN AP.

Still further, the eNB may query from the WT which of its APs are currently using desired WLAN radio configuration(s).

In particular, available APs may be queried which support a predetermined configuration or a configuration fitting best to the current situation in relation to an ongoing co-operation, e.g. for the purposes of reducing IDC interference at an UE or at many UEs associated with the co-operation.

In one embodiment of the present invention, the network node of the first radio access technology (e.g. an eNB) may determine a configuration or a couple of configurations which fulfill certain requirements with respect to an ongoing co-operation. Namely, configurations may be determined which are advantageous in relation to avoidance of IDC interference when considering configurations of the first radio access technology, i.e. configurations which are IDC friendly with respect to avoidance of IDC interference. Once determined, the network node of the first radio access technology may query for the access entity or access entities using that desired (determined) configuration(s).

In so doing, an access entity may be utilized such that the co-operation of said first radio access technology with a second radio access technology (e.g. an LWA operation) can be started without incurring IDC interference.

Furthermore, the eNB may command/request WLAN AP and/or WT to use certain WLAN radio configuration(s).

Still further, the eNB may indicate to WLAN AP and/or WT whether or not UE(s) with IDC problem exist on the cell. This information may preferably be used to select a WLAN radio configuration so that an IDC problem would not exist for any UE i.e. WLAN and LTE frequencies are far enough from each others.

Furthermore, the eNB may indicate to WLAN AP and/or WT whether IDC avoidance should be utilized or not, with the same preferable usage of this information as mentioned above. Such IDC avoidance may comprise e.g. changing the WLAN configuration (e.g. changing WLAN AP(s) used in the co-operation).

Finally, in one embodiment, the WLAN AP/WT may request/command/propose the eNB to use certain LTE bands/carrier/frequencies.

Further, in the more specific terms, according to exemplary embodiments of the present invention, the above information may be used such that it is possible to select (or re-assign) the WLAN radio configuration and/or LTE frequencies so that there is no IDC problem for any UEs or for selected UE(s).

According to exemplary embodiments of the present invention, such selection or reassignment may be realized e.g. with logic/signaling as discussed below.

Namely, the eNB may query, over the LTE-WLAN interface (e.g. Xw), from (e.g. LWA-capable) WLAN AP(s)/WLAN WT regarding currently used WLAN channel(s) and/or other WLAN radio configuration(s) (e.g. ISM band, operating class).

Further, the WLAN AP/WLAN WT may responds over the Xw interface with the requested information.

In one embodiment, alternatively or additionally, the UE may report to the eNB the WLAN channel(s) used by detected/connected (LWA-capable) WLAN AP(s) along with the WLAN/AP ID within the WLAN measurement results.

Still further, the eNB may determine whether the assignment of the (scheduled) LTE frequencies to the UEs using LWA mode can be made such to avoid those to experience IDC interference.

Furthermore, the eNB may request the WLAN AP/WLAN WT to perform channel reselection, and report back the new adopted WLAN channel(s).

The WLAN AP/WLAN WT may either reject or accept the request above, and may provide the new selected channel(s) to the eNB.

Thus, modifying the configuration of the co-operation may comprise changing one or both of LTE configuration(s), such as which frequencies to use, and WLAN configuration(s), such as which WLAN APs to use in the co-operation.

Exemplary embodiments of the present invention described above achieve at least the following advantages.

Namely, according to these embodiments, the eNB is in control of further flexibility/information to prevent/solve IDC issues.

Furthermore, the behavior of such UEs experiencing IDC problems is more predictable.

As already mentioned above, it should be noted that, although in the foregoing exemplary embodiments of the present invention have been described from the perspective of LWA/LWI (since in both cases the WLAN usage is controlled by the network), a similar mechanism may be applied for Licensed Assisted Access (LAA)-LTE aggregation or any (unlicensed) accesses when aggregated to LTE/5G in close-by frequency bands.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 15:
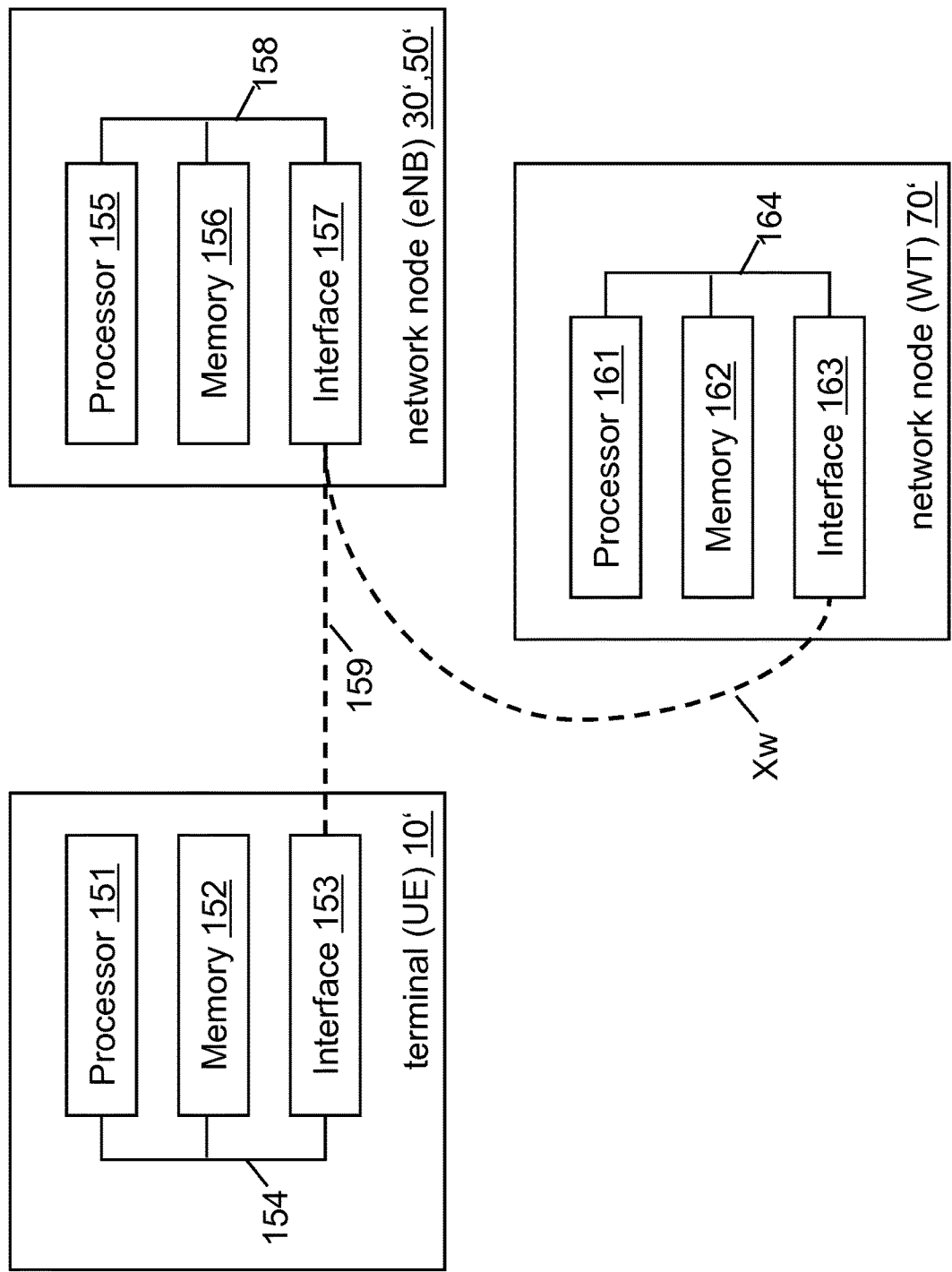
FIG. 15 is a block diagram alternatively illustrating apparatuses according to exemplary embodiments of the present invention.

In FIG. 15, an alternative illustration of apparatuses according to exemplary embodiments of the present invention is depicted. As indicated in FIG. 15, according to exemplary embodiments of the present invention, the apparatus (terminal) 10' (corresponding to the terminal 10) comprises a processor 151, a memory 152 and an interface 153, which are connected by a bus 154 or the like. Further, according to exemplary embodiments of the present invention, the apparatus (network node) 30'/50' (corresponding to the network node 30/50) comprises a processor 155, a memory 156 and an interface 157, which are connected by a bus 158 or the like. Further, according to exemplary embodiments of the present invention, the apparatus (network node) 70' (corresponding to the network node 70) comprises a processor 161, a memory 162 and an interface 163, which are connected by a bus 164 or the like. The apparatuses may be connected via link 159 and/or Xw, respectively.

The processor 151/155/161 and/or the interface 153/157/163 may also include a modem or the like to facilitate communication over a (hardwire or wireless) link, respectively. The interface 153/157/163 may include a suitable transceiver coupled to one or more antennas or communication means for (hardwire or wireless) communications with the linked or connected device(s), respectively. The interface 153/157/163 is generally configured to communicate with at least one other apparatus, i.e. the interface thereof.

The memory 152/156/162 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the terminal 10 (in a mobile network scenario allowing co-operation of a first radio access technology with a second radio access technology) comprises at least one processor 151, at least one memory 152 including computer program code, and at least one interface 153 configured for communication with at least another apparatus. The processor (i.e. the at least one processor 151, with the at least one memory 152 and the computer program code) is configured to perform detecting a need to avoid an in-device co-existence interference in relation to said co-operation (thus the apparatus comprising corresponding means for detecting), and to execute performing at least one action for avoiding the in-device co-existence interference (thus the apparatus comprising corresponding means for performing). Preferably, according to exemplary embodiments of the present invention, the processor (i.e. the at least one processor 151, with the at least one memory 152 and the computer program code) may be configured to perform some or all method steps as discussed above in relation to the terminal 10.

Further, according to exemplary embodiments of the present invention, an apparatus representing the network node 30 (in a mobile network scenario allowing co-operation of a first radio access technology with a second radio access technology)/the network node 50 (of a first radio access technology in a mobile network scenario allowing co-operation of said first radio access technology with a second radio access technology) comprises at least one processor 155, at least one memory 156 including computer program code, and at least one interface 157 configured for communication with at least another apparatus. The processor (i.e. the at least one processor 155, with the at least one memory 156 and the computer program code) is configured to perform receiving information indicative of a need to avoid in-device coexistence interference in relation to said co-operation (thus the apparatus comprising corresponding means for receiving), and to perform modifying a configuration for said co-operation on the basis of said received information (thus the apparatus comprising corresponding means for modifying). Alternatively, or in addition, the processor (i.e. the at least one processor 155, with the at least one memory 156 and the computer program code) is configured to perform collecting information on a configuration for said second radio access technology (thus the apparatus comprising corresponding means for collecting), to perform detecting a need to avoid in-device coexistence interference for a user terminal configured with said co-operation based on said information on said configuration for said second radio access technology (thus the apparatus comprising corresponding means for detecting), and to perform modifying, upon detected need to avoid said in-device coexistence interference, a configuration of said co-operation (thus the apparatus comprising corresponding means for modifying). Preferably, according to exemplary embodiments of the present invention, the processor (i.e. the at least one processor 155, with the at least one memory 156 and the computer program code) may be configured to perform some or all method steps as discussed above in relation to the network node 30 or the network node 50.

Further, according to exemplary embodiments of the present invention, an apparatus representing the network node 70 (in a mobile network scenario allowing co-operation of a first radio access technology with a second radio access technology, the network node being a network node of said second radio access technology) comprises at least one processor 161, at least one memory 162 including computer program code, and at least one interface 163 configured for communication with at least another apparatus. The processor (i.e. the at least one processor 161, with the at least one memory 162 and the computer program code) is configured to perform receiving information related to in-device coexistence interference in relation to said co-operation (thus the apparatus comprising corresponding means for receiving), and to perform transmitting a response on the basis of said information related to said in-device coexistence interference (thus the apparatus comprising corresponding means for transmitting). Preferably, according to exemplary embodiments of the present invention, the processor (i.e. the at least one processor 161, with the at least one memory 162 and the computer program code) may be configured to perform some or all method steps as discussed above in relation to the network node 70.

For further details regarding the operability/functionality of the individual apparatuses, reference is made to the above description in connection with any one of FIGS. 1 to 14, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for reduction of in-device coexistence interference. Such measures exemplarily comprise (in a mobile network scenario allowing co-operation of a first radio access technology with a second radio access technology) detecting a need to avoid an in-device co-existence interference in relation to said co-operation, and performing at least one action for avoiding the in-device co-existence interference.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3$^{rd}$ Generation Partnership Project
ANDSF access network detection and selection function
AP access point
BSS billing support system
BSSID basic service set identifier
CA carrier aggregation
CSI channel state information
DC dual connectivity
DRX discontinuous reception
eNB evolved NodeB, eNodeB
EPS evolved packet system
E-UTRA evolved universal terrestrial radio access
GNSS global navigation satellite system
HESSID homogenous extended service set identifier
IDC In-Device Coexistence
IW interworking
ISM industrial, scientific, and medical
LTE Long Term Evolution
LWA LTE-WLAN aggregation
LWI LTE-WLAN interworking
MO mobile originating
RAN radio access network
RF radio frequency
RLM radio link monitoring
RRC radio resource control
RRM radio resource management
RSSI received signal strength indicator
SSID service set identifier
UE user equipment
WAN wide area network
WLAN wireless local area network
WT WLAN termination

The invention claimed is:

1. An apparatus, comprising:
at least one processor,
at least one memory including computer program code, and
at least one interface configured for communication with at least another apparatus,
wherein the at least one processor, with the at least one memory and the computer program code, are configured to cause a user equipment to:
detect a need to avoid an in-device co-existence interference in relation to a co-operation of a first radio access technology with a second radio access technology, and
transmit, by the user equipment to a network node of said first radio access technology, information indicative of said need to avoid said in-device coexistence interference, wherein said information comprises an access entity identifier that identifies at least one access entity of said second radio access technology that is causing or is expected to cause in-device coexistence interference during said co-operation.

2. The apparatus according to claim 1, wherein said information comprises at least one of:
a request to deconfigure said co-operation of said first radio access technology with said second radio access technology,
a request to deactivate said co-operation of said first radio access technology with said second radio access technology, and
a request to suspend said co-operation of said first radio access technology with said second radio access technology.

3. The apparatus according to claim 2, wherein said request is transmitted in a measurement report regarding said second radio access technology, or
said request is represented by a predetermined flag in a transmitted message comprising at least said predetermined flag.

4. The apparatus according to claim 1, wherein the at least one processor, with the at least one memory and the computer program code, are configured to cause the user equipment to:
receive a message indicative of a configuration of said co-operation;
determine that said configuration of said co-operation would cause in-device coexistence interference, wherein the at least one action comprises:
restrain from applying the received configuration for the co-operation.

5. The apparatus according to claim 4, wherein the at least one processor, with the at least one memory and the computer program code, are configured to cause the user equipment to perform:
signal a message indicative of a non-acknowledgement of said configuration of said co-operation.

6. The apparatus according to claim 4, wherein the at least one processor, with the at least one memory and the computer program code, are configured to cause the user equipment to perform:
signal a message indicative of an expected in-device coexistence interference if the configuration is applied for said co-operation.

7. The apparatus according to claim 1, wherein the at least one processor, with the at least one memory and the computer program code, are configured to cause the user equipment to:
receive a message including a list of at least one access entity of said second radio access technology considered for said co-operation;
detect expectation of said in-device coexistence interference with respect to at least one access entity of said list, wherein the at least one action comprises:
deny co-operation of said first radio access technology with said second radio access technology with respect to said at least one access entity.

8. The apparatus according to claim 1, wherein the at least one processor, with the at least one memory and the computer program code, are configured to cause the user equipment to:
receive a message including a list of at least one access entity of said second radio access technology considered for a measurement report;

detect expectation of said in-device coexistence interference with respect to at least one access entity of said list, wherein the at least one action comprises:

restrain from including, to the measurement report, said at least one access entity expected to cause in-device coexistence interference.

9. The apparatus according to claim 1, wherein said first radio access technology is at least one of LTE, LTE-A, and 5G, and said second radio access technology is at least one of WLAN, Wi-Fi, Bluetooth®, and small cell technology, and said co-operation is either aggregation operation of said first radio access technology with said second radio access technology or interworking operation of said first radio access technology with said second radio access technology.

10. An apparatus, comprising:

at least one processor, at least one memory including computer program code, and at least one interface configured for communication with at least another apparatus, wherein the at least one processor, with the at least one memory and the computer program code, are configured to cause a network node of a first radio access technology to:

receive, from a user equipment, information indicative of a need to avoid in-device coexistence interference in relation to a co-operation of said first radio access technology with a second radio access technology, wherein the information comprises an indication of at least one access entity of said second radio access technology that is causing or is expected to cause in-device coexistence interference during said co-operation; and modify a configuration for said co-operation on the basis of said received information, including being configured to send a message from the network node of the first radio access technology to a network node of the second radio access technology to modify a configuration of the network node of the second radio access technology.

11. The apparatus according to claim 10, wherein the at least one processor, with the at least one memory and the computer program code, are configured to cause the user equipment to perform, in relation to said modifying, at least one of:

deactivate said co-operation with respect to a channel of said first radio access technology and/or a channel of said second radio access technology, wherein said information comprises an indication of the channel causing said in-device coexistence interference or is expected to cause said in-device coexistence interference, deconfigure said co-operation, if said information comprises a request to deconfigure said co-operation, deactivate said co-operation, if said information comprises a request to deactivate said co-operation, and suspend said co-operation, if said information comprises a request to suspend said co-operation.

12. An apparatus, comprising:

at least one processor, at least one memory including computer program code, and at least one interface configured for communication with at least another apparatus, wherein the at least one processor, with the at least one memory and the computer program code, are configured to cause a network node of a first radio access technology to:

collect, from a second radio access technology, information on a configuration for the second radio access technology, detect a need to avoid in-device coexistence interference for a user terminal configured with a co-operation of said first radio access technology with said second radio access technology based on said information on said configuration for said second radio access technology, and modify, based upon the detected need to avoid said in-device coexistence interference, a configuration of said co-operation, including being configured to send a message from the network node of the first radio access technology to a network node of the second radio access technology to modify a configuration of the network node of the second radio access technology.

13. The apparatus according to claim 12, wherein the at least one processor, with the at least one memory and the computer program code, are configured to cause the apparatus, in relation to said collecting, to:

collect, from a management entity of said second radio access technology, information on which at least one access entity of said second radio access technology managed by said management entity uses a specific configuration for said second radio access technology.

14. The apparatus according to claim 12, wherein the at least one processor, with the at least one memory and the computer program code, are configured to cause the apparatus, in relation to said detecting, to:

compare said configuration for said second radio access technology with a configuration for said first radio access technology; and detect, based on the comparison, that a change of the configuration of the co-operation is needed to avoid said in-device coexistence interference.

15. The apparatus according to claim 12, wherein the at least one processor, with the at least one memory and the computer program code, are configured to cause the apparatus, in relation to said modifying, to transmit at least one of:

a message indicative of existence or expectation of said in-device coexistence interference, a message indicative of that an interference avoidance measure regarding said in-device coexistence interference is to be utilized, and a message indicating a changed configuration for said second radio access technology, wherein the configuration is changed such that said in-device coexistence interference is avoided.

16. The apparatus according to claim 12, wherein the at least one processor, with the at least one memory and the computer program code, are configured to cause the apparatus to perform:

receive a response from said second radio access technology, wherein the response comprises a request to modify a configuration for said first radio access technology.

* * * * *